United States Patent [19]
Vannatta et al.

[11] Patent Number: 5,924,044
[45] Date of Patent: Jul. 13, 1999

[54] MODULAR COMMUNICATION DEVICE AND METHOD OF PROVIDING COMMUNICATIONS THEREWITH

[75] Inventors: Louis Jay Vannatta; William P. Alberth, Jr., both of Crystal Lake, Ill.

[73] Assignee: Motorola, Inc., Schaumburg, Ill.

[21] Appl. No.: 08/806,979

[22] Filed: Feb. 26, 1997

[51] Int. Cl.[6] .................................................. H04Q 7/08
[52] U.S. Cl. ...................... 455/556; 455/572; 455/575; 379/433
[58] Field of Search .................................. 455/90, 95, 128, 455/466, 550, 556, 557, 558, 575, 566, 567, 348, 349, 351, 572; 379/368, 428, 433, 61, 59

[56] References Cited

U.S. PATENT DOCUMENTS

| | | | |
|---|---|---|---|
| 4,941,203 | 7/1990 | Patsiokas et al. | 455/53 |
| 5,020,090 | 5/1991 | Morris . | |
| 5,040,204 | 8/1991 | Sasaki et al. . | |
| 5,109,539 | 4/1992 | Inubushi et al. | 455/89 |
| 5,197,092 | 3/1993 | Bamburak | 379/59 |
| 5,259,018 | 11/1993 | Grimmett et al. . | |
| 5,303,291 | 4/1994 | Takati et al. . | |
| 5,365,573 | 11/1994 | Sakamoto et al. | 379/61 |
| 5,517,682 | 5/1996 | Dayani | 455/89 |
| 5,526,403 | 6/1996 | Tam . | |
| 5,570,413 | 10/1996 | Ahlberg et al. | 379/59 |
| 5,590,396 | 12/1996 | Henry | 455/33.1 |
| 5,606,594 | 2/1997 | Register et al. | 379/428 |
| 5,657,370 | 8/1997 | Tsugane et al. | 455/550 |
| 5,802,460 | 9/1998 | Parvulescu et al. | 455/550 |
| 5,809,432 | 9/1998 | Yamashita | 455/557 |

FOREIGN PATENT DOCUMENTS

| | | | |
|---|---|---|---|
| 0 263 666 | 4/1988 | European Pat. Off. | H04M 1/72 |
| 0521609A2 | 1/1993 | European Pat. Off. . | |
| 0613257A2 | 8/1994 | European Pat. Off. . | |
| WO 97/00792 | 1/1997 | WIPO | B60R 11/02 |

OTHER PUBLICATIONS

PCT WO 90/08431, filed Jan. 16, 1990, "Multi–Attachment Portable Radio," Motorola, Inc., Jul. 26, 1990.
Pending U.S. Pat. Application, Serial No. 08/489,872, filed Jun. 13, 1995, "Latching Mechanism and Method of Latching Thereby," Motorola, Inc.
Pending U.S. Pat. Application, Serial No. 08/404,808, filed Mar. 15, 1995, "Telephone Handset Mounting Receptacle With Card Reader and Method of Positioning Thereof," Motorola, Inc.

*Primary Examiner*—Edward F. Urban
*Assistant Examiner*—Thuan T. Nguyen
*Attorney, Agent, or Firm*—Richard K. Clark; John J. Oskorep

[57] ABSTRACT

A modular communication device (102), which provides for radio frequency (RF) communication in a communication system (100), comprises a first modular unit (106) and a second modular unit (108). The first modular unit (106) includes a housing (110); a user interface (113) including a display (114) and keys (116); electrical circuitry (605), including a transceiver (606) coupled to an antenna (610); a battery connection interface (308) for receiving a battery (302); and a connection interface (120). The second modular unit (108) includes a housing (128); a user interface (135) including a speaker (650), a microphone (648), and a keypad (140); a retractable antenna (134); a battery connection interface (402) for receiving a battery (142); and a connection interface (143). When the connection interfaces (143, 120) are connected, the user interface (135), the antenna (134), and the battery connection interface (402) are coupled to the electrical circuitry (602).

32 Claims, 11 Drawing Sheets

MODULAR COMMUNICATION DEVICE AND METHOD OF PROVIDING COMMUNICATIONS THEREWITH

FIELD OF THE INVENTION

The present invention relates generally to the field of communication devices, and more particularly to the field of modular portable communication devices.

BACKGROUND OF THE INVENTION

There is an existing need to provide a portable communication device that is smaller, more versatile, and more flexible. In addition, there is an existing need for such a device to electrically operate from a standard, small, off-the-shelf battery cell or cells.

BRIEF SUMMARY OF THE INVENTION

The primary object of the present invention is to provide a modular radio communication device for radio frequency (RF) communication in a communication system. A further object of the present invention is to provide a method for communicating with a modular radio communication device. As discussed in greater detail below, the present invention overcomes the limitations of the existing art to achieve these objects and other benefits.

In the present invention, a communication system comprises a first modular unit and a second modular unit. The first modular unit includes a first housing, a first user interface with a display and keys, electronic circuitry coupled to an antenna, a first battery connection interface for receiving a first battery, and a first connection interface.

The electronic circuitry includes a transceiver and power management circuitry. The transceiver sends and receives radio signals at multiple data transmission rates. The power management circuitry varies the voltage to the electronic circuitry depending upon the data transmission rate in use by the transceiver. As a result, the first modular unit operates using a small battery cell or cells.

The second modular unit includes a second housing, a second user interface including a speaker, a microphone, and a key pad, a retractable antenna, a second battery connection interface for receiving a second battery, and a second connection interface. When the first and second connection interfaces are connected, the user interface, the retractable antenna, and the second battery interface of the second modular unit are coupled to the electronic circuitry of the first modular unit.

A method for communicating with a modular radio communication device is provided. This method includes registering the first modular unit, receiving an incoming call, establishing a traffic channel, transmitting messages while the user connects the first and second modular units to answer a call.

DETAILED DESCRIPTION OF THE PREFERRED EMBODIMENTS

Figure 1:
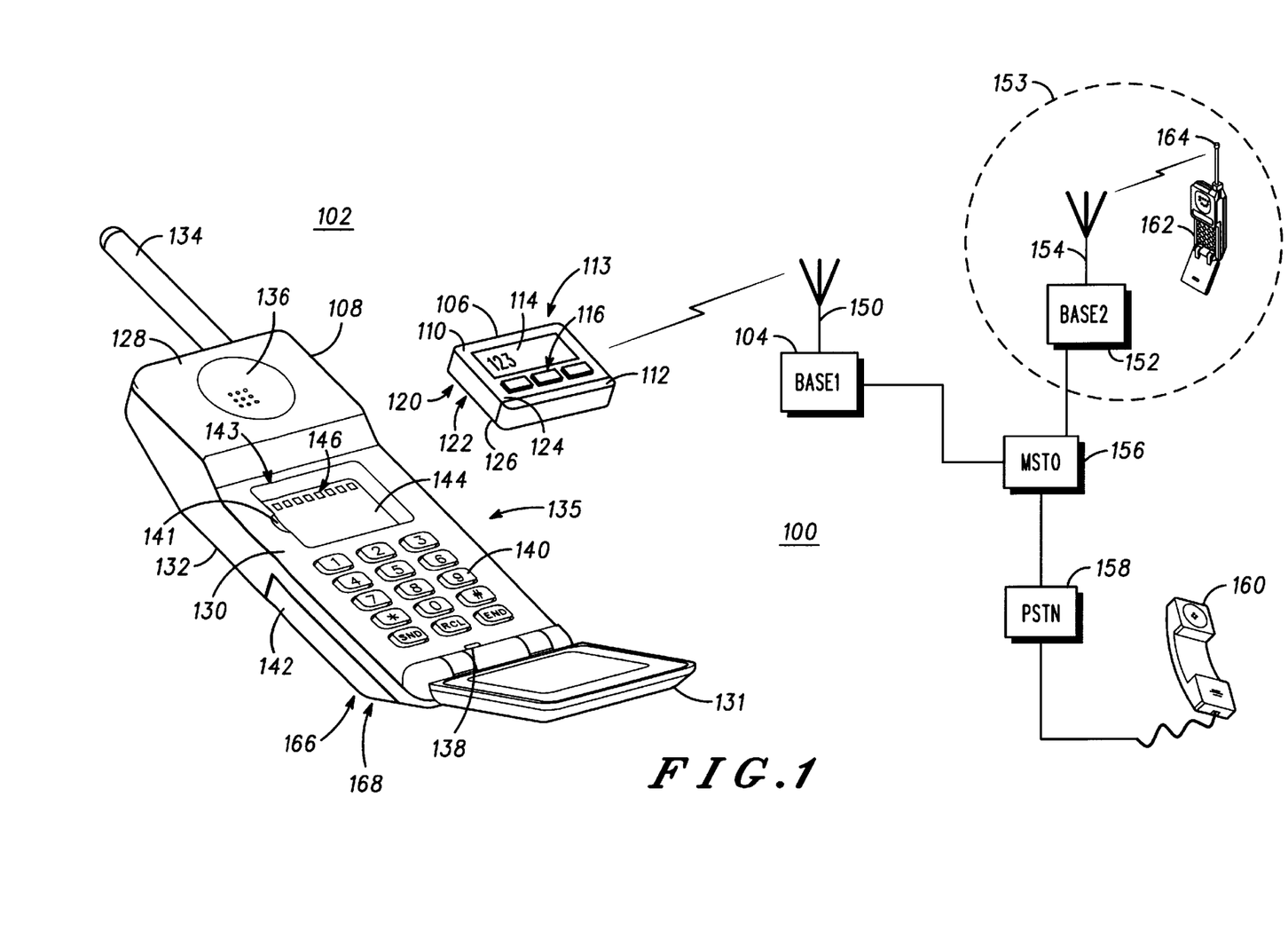
FIG. 1 is an illustration showing a communication system comprising a modular communication device and a base station, the modular communication device including a first modular unit and a second modular unit shown unconnected.

FIG. 1 is an illustration of a communication system 100 comprising a modular communication device 102 and a base station 104. Modular communication device 102 communicates with base station 104 via radio frequency (RF) signals when located within a coverage area of base station 104. Base station 104 may be a part of a conventional cellular or cellular-like communication system. Base station 104 is coupled to a mobile telephone switching office (MTSO) 156, which is in turn coupled to a public switched telephone network (PSTN) 158. Communication system 100 may also include other base stations, such as a base station 152 having an antenna 154 and serving a coverage area 153. Other communication devices, such as a mobile station 162 having an antenna 164, may also communicate via RF signals within communication system 100. In addition, conventional fixed telephone units that are coupled to PSTN 158 through land line connections, such as a fixed telephone unit 160, may also communicate within communication system 100.

Modular communication device 102 includes a first modular unit 106 and a second modular unit 108. First modular unit 106 comprises a housing 110, a user interface 113, and a connection interface 120. Housing 110 defines a front side 124 and a back side 126, and includes a battery compartment 112. User interface 113 includes a display 114 and keys 116 which are both directed outwardly from front side 124. Connection interface 120 is provided on back side 126 and includes electrical contacts 122.

Figure 3:
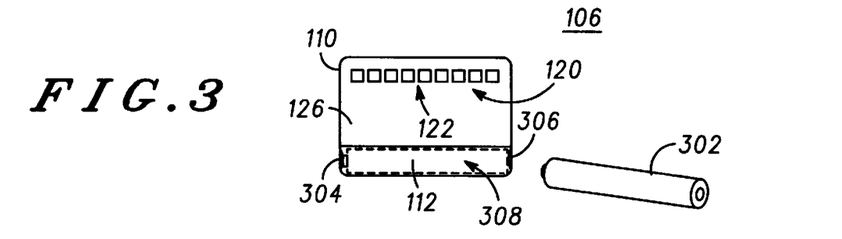
FIG. 3 is an illustration showing a rear plan view of the first modular unit, and a battery for operating the first modular unit.

FIG. 3 is an illustration showing a rear plan view of first modular unit 106. Here, connection interface 120 having electrical contacts 122 is shown in better detail. FIG. 3 also shows that battery compartment 112 is used for storing a battery 302, which is preferably a AAA-size battery with an operating voltage of 1.5 volts. A battery connection interface 308 is provided within battery compartment 112 and includes electrical contacts 304 and 306. Dashed lines within battery compartment 112, which illustrate the positioning of battery 302 when properly inserted therein, show that battery contacts of battery 302 make electrical contact with electrical contacts 304 of battery connection interface 308.

Referring back to FIG. 1, second modular unit 108 comprises a housing 128, a keypad cover 131, a user interface 135, a retractable antenna 134, a connection interface 143, and a battery connection interface (not visible in FIG. 1) for attaching a battery pack 142. Housing 128 defines a front side 130 and back side 132. User interface 135 includes a speaker disposed in housing 128 and directed outward from front side 130 through a speaker grille 136, a microphone disposed in housing 128 and directed outward from front side 130 through a hole 138, and a keypad 140. Keypad cover 131, shown in an open position in FIG. 1, is capable of opening and closing to expose and cover keypad 140. Retractable antenna 134 partially retracts within housing 128 and is shown in a non-retracted position.

Figure 4:
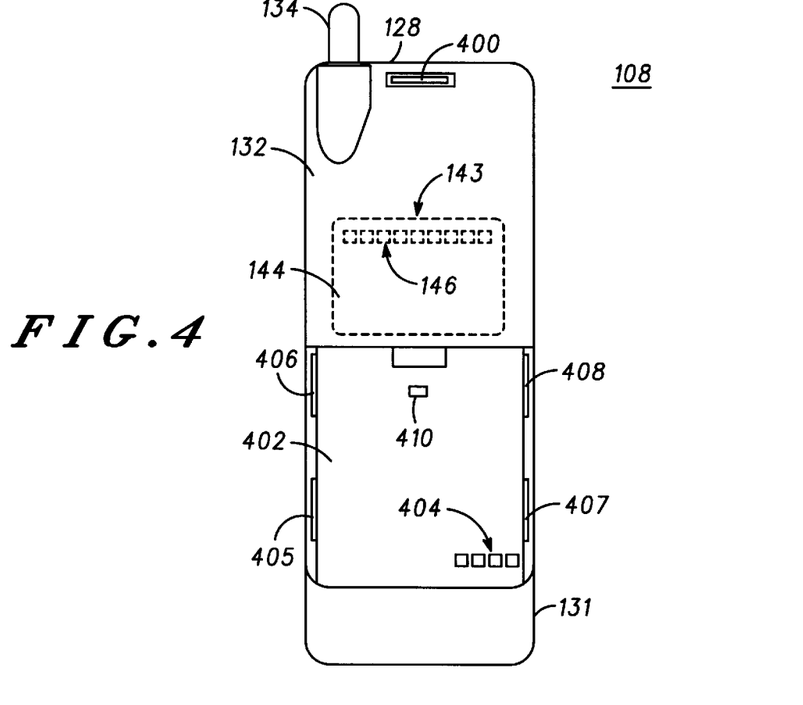
FIG. 4 is an illustration showing a rear plan view of the second modular unit.

FIG. 4 shows a rear plan view of second modular unit 108 and a battery connection interface 402 thereof, without battery pack 142 being attached thereto. In the embodiment shown, battery connection interface 402 includes electrical contacts 404, guide rails 405 and 406, guide rails 407 and 408, and a slot 410.

Referring back to FIG. 1, battery pack 142 includes battery cells and associated circuitry 512 disposed therein. Battery pack 142 includes a connection interface 166 that includes electrical contacts 168 that are coupled to battery cells and associated circuitry 512. As shown in the rear plan view of FIG. 5, battery pack 142 has a connection interface 500 configured to attach to battery connection interface 402 of first modular unit 106 (FIG. 4). Connection interface 500 includes electrical contacts 502, guide rails 507 and 508, guide rails 509 and 510, and a latching mechanism 504 having a button portion 505 and a catch 506.

Figure 5:
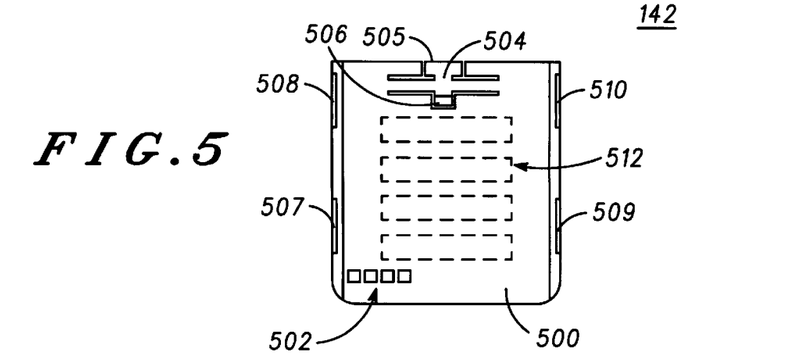
FIG. 5 is an illustration showing a rear plan view of a battery pack that connects to the second modular unit.

With battery connection interface 402 and connection interface 502, battery pack 142 may be slid on and attached to second modular unit 108. When battery pack 142 is fully attached to second modular unit 108 in a "locked" position, each of electrical contacts 502 of battery pack 142 make electrical contact with one of electrical contacts 404 of second modular unit 108. Here, catch 506 is engaged within slot 506. Guild rails 507 and 508 of battery pack 142 are disposed opposite and captivated beneath guide rails 407 and 408 of second modular unit 106. Similarly, guide rails 509 and 510 of battery pack 142 are disposed opposite and captivated beneath guide rails 405 and 406 of second modular unit 108. To disengage battery pack 105 from second modular unit 108, button portion 505 is pressed in a direction toward second modular unit 108, thereby causing a twisting of latching mechanism 504 where catch 506 retracts from slot 410. Battery pack 105 may then be slid along the direction of guide rails 405, 406, 407, and 408 until lifted and detached.

Second modular unit 108 may be alternatively constructed such that battery cells and associated circuitry 512 are disposed within housing 128. Here, of course, battery pack 142 and battery connection interface 402 are unneccesary.

Referring back to FIG. 4, housing 128 defines an opening on back side 132 that exposes an accessory connector 400. Accessory connector 400 includes electrical contacts and provides an interface to an accessory unit such as a facsimile machine, a modem, an additional power source, etc.

Referring back to FIG. 1, second modular unit 108 is configured to receive first modular unit 106. Connection interface 143 of second modular unit 108 includes an opening 144 and electrical contacts 146 disposed within opening 144. Housing 106 is sized to pressure-fit within opening 144 of connection interface 143. When first modular unit 106 is received within opening 144, connection interfaces 120 and 143 connect where electrical contacts 122 make electrical contact with electrical contacts 146.

Figure 2:
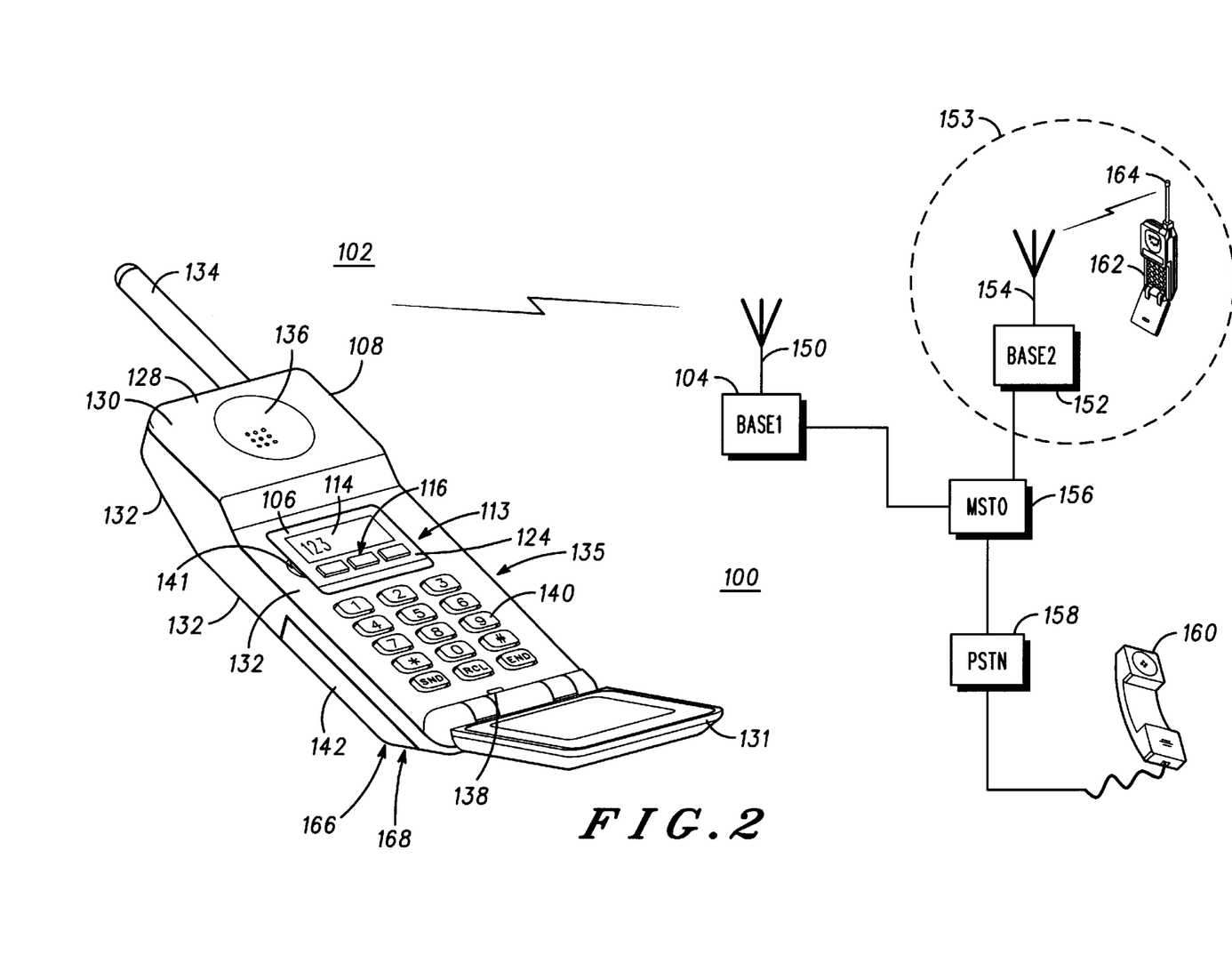
FIG. 2 is an illustration showing the modular communication device with the first modular unit and the second modular unit shown connected.

FIG. 2 shows first modular unit 106 received within second modular unit 108. As shown, display 114 and the plurality of keys 116 of first modular unit 106 are directed outward from front side 130 of second modular unit 108. Front side 124 of first modular unit 106 and front side 130 of second modular unit 108 are substantially flush.

Referring back to FIG. 1, housing 110 of first modular unit 106 is sized to fit within a user's palm and may be comfortably attached to a user's clothing with a conventional belt clip. Alternatively, referring back to FIG. 2, housing 128 of second modular unit 108 is sized larger than housing 110, and more particularly, sized to fit within a user's hand where speaker grille 136 and hole 138 are distanced appropriately to provide proper ergonomics for conventional two-way telephone or telephone-like communication.

As will be described in more detail below, first modular unit 102, when used without second modular unit 108, is independently operable and provides limited communication capability for a user thereof. When used with second modular unit 108, communication device 102 provides expanded communication capability for the user.

Figure 6:
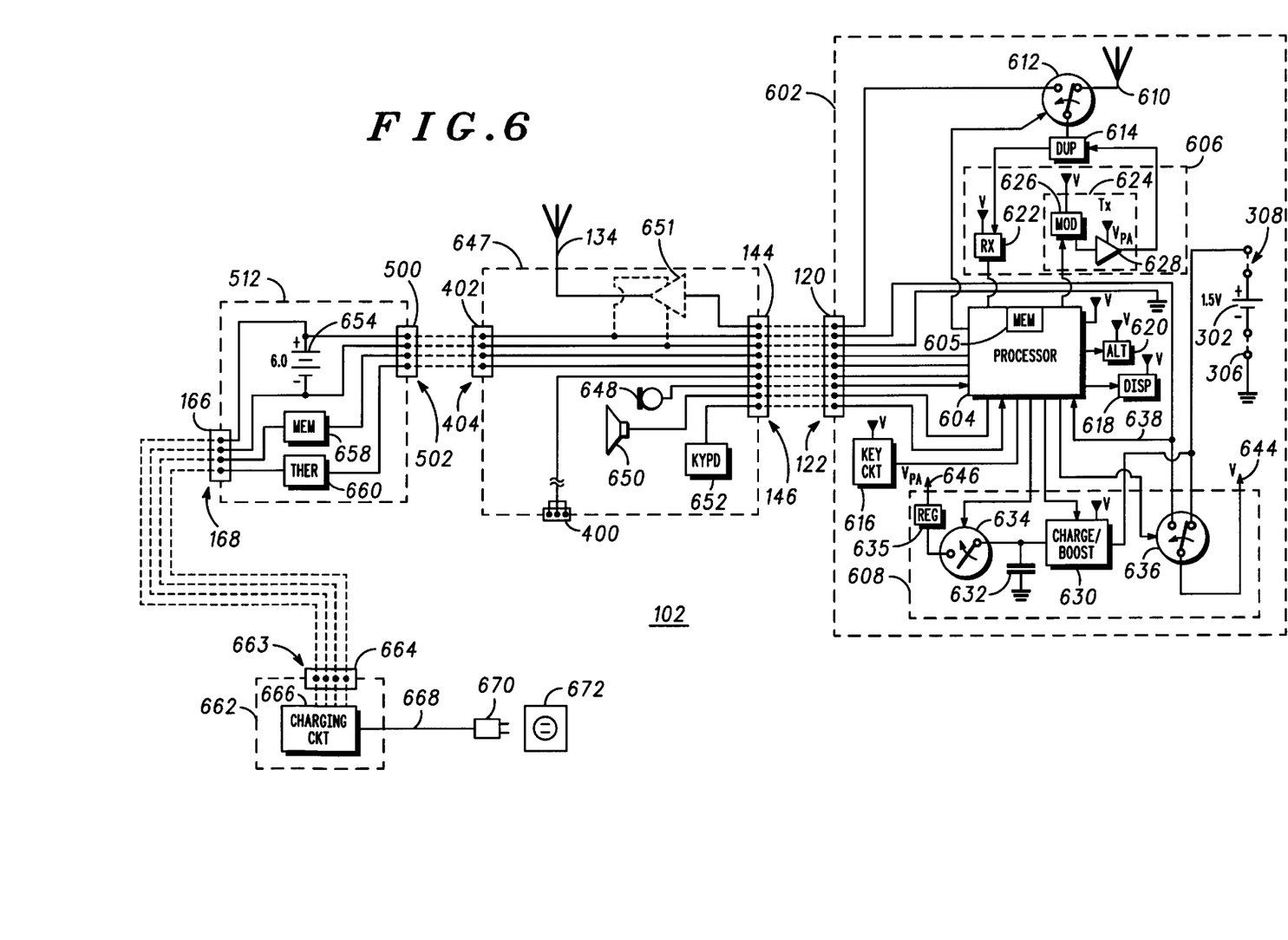
FIG. 6 is a schematic diagram of electrical circuitry of the modular communication device and electrical components of battery pack.

FIG. 6 is a schematic block diagram of modular communication device 102, including electrical circuitry 602 of first modular unit 106, electrical components 647 of second modular unit 108, and electrical components 656 of battery pack 142.

Electrical circuitry 602 includes a processor 604, used to process signals and to control a large portion of electrical circuitry 602; a transceiver 606, including a receiver 622 and a transmitter 624, used for receiving and transmitting RF signals; an antenna 610; switching circuitry 612, used to switchably couple antenna 610 to transceiver 606; power management circuitry 608, used to provide and control electrical power to electrical circuitry 602; a duplexer 614, used to appropriately switch antenna 610 in receive and transmit modes of transceiver 606; key circuitry 616, used to generate signals to processor 604 in response to actuations of keys 116 (FIG. 1); display circuitry 618, used to translate signals from processor 604 to control and operate display 114 (FIG. 1); and alert circuitry 620, used to provide audible alert signals in response to signals from processor 604. As shown, most of electrical contacts 122 of connection interface 120 are coupled to processor 604.

When first modular unit 106 is not attached to second modular unit 108, battery cell 302 provides the necessary power to operate electrical circuitry 602. When attached to battery connection interface 308, battery cell 302 is coupled to power management circuitry 608. Power management circuitry 608 includes charger/booster circuitry 630, a capacitor 632, switching circuitry 634, and switching circuitry 636. Processor 604 maintains switching circuitry 636 to provide power from battery cell 302. Power management circuitry 608 provides a regulated supply voltage V for most of electrical circuitry 602.

However, battery cell 302 has a voltage that, in itself, is too low to operate a power amplifier 628 of transceiver 606 during amplification. Therefore, during a time period before power amplifer 628 amplifies, charger/booster circuitry 630 charges capacitor 632 with a charge sufficient to operate power amplifier 628 during amplification. When capacitor 632 is sufficiently charged and amplification is necessary, processor controls switching circuitry 634 to discharge capacitor 632. Thus, at least during a substantial portion of amplification, power amplifer 628 is biased at a voltage $V_{PA}$ that is greater than regulated supply voltage V. Preferably, capacitor 632 is a supercapacitor having a relatively large capacitance.

When first modular unit 106 is not attached to second modular unit 108, antenna 610 is coupled to transceiver 606 through switching circuitry 612. Through antenna 610, receiver 622 receives RF signals from base station 104.

Base station 104 typically generates RF signals having control data, voice, and/or short messaging data modulated thereon. Receiver 622 may receive an RF signal having a paging message modulated thereon, where the paging message is uniquely intended for first modular unit 106. Receiver 622 demodulates such an RF signal and provides data at processor 604 for interpretation. Processor 604 decodes the data and, after determining that the paging message was uniquely intended for first modular unit 106, provides an audible alert signal through alert circuitry 620.

Transmitter 624 includes a modulator 626 and power amplifer 628. Transmitter 624 typically receives data from processor 604, modulates the data with RF signals, amplifies the RF signals through power amplifer 628, and transmits the amplified RF signals through antenna 610 when first modular unit 106 is operating without second modular unit 108.

Electrical components 647 of second modular unit 108 include a microphone 648, a speaker 650, a keypad interface circuit 652, antenna 134, and accessory connector 400. Electrical components 647 are coupled to electrical contacts 146 of connection interface 144.

Battery cells and associated circuitry 512 of battery pack 142 include battery cells 654, a memory 658 for storing battery identification parameters, and a thermistor 660 providing an indication of the temperature of battery pack 142. Battery cells and associated circuitry 512 are coupled to electrical contacts 502 of connection interface 500 and to electrical contacts 168 of connection interface 166.

When connection interface 120 of first modular unit 106 and connection interface 144 of second modular unit 108 are connected, electrical components 647 are coupled to electrical circuitry 602.

Processor 604 detects the presence of second modular unit 108. Such detection may be performed with any suitable method, such as with a line 638 that is coupled to battery cells 654. In response to such detection, processor 604 controls switching circuitry 636 to switch from using battery cell 302 to using battery cells 654 to power electrical circuitry 602. Electrical circuitry 602 is thereby provided with battery cells 654 having a greater supply voltage and capacity. In addition, processor 604 controls switching circuitry 612 to switch from using antenna 610 to using antenna 134 for receiving and transmitting RF signals.

Full duplex voice communications is made possible when modular communication device 102 is configured as shown in FIG. 2. A user of modular communication device 102 is capable of initiating and receiving calls as is typical in a conventional cellular or cellular-like system. Referring back to FIG. 6, processor 604 provides electrical signals at speaker 650 to provide voice audio of a called or calling party, receives electrical signals from microphone 648 generated from voice audio of the user, and receives signals from keypad interface circuitry 652 generated by key actuations at keypad 140.

FIG. 6 also illustrates a battery charger 662 that includes battery charging circuitry 666, a battery charger interface 664 having electrical contacts 663, and an electrical cord 668 having a transformer plug 670 on an end thereof. Transformer plug 670 is configured for insertion into an alternating current (AC) outlet 672, where battery charging circuitry 666 receives its power for operating and charging battery pack 142. To charge battery cells 654, connection interface 166 is connected to charging interface 664 where electrical contacts 168 make electrical contact with electrical contacts 663.

Referring back to FIG. 1, communication system 100 preferably provides RF communication in accordance with a time-division multiplexed (TDM) protocol. Examples of a such protocols include protocols defined by RCR-27D, which is used in a Personal Digital Cellular (PDC) system, or defined by IS-136, which is used in a North American Digital Cellular (NADC) system.

Figure 7:
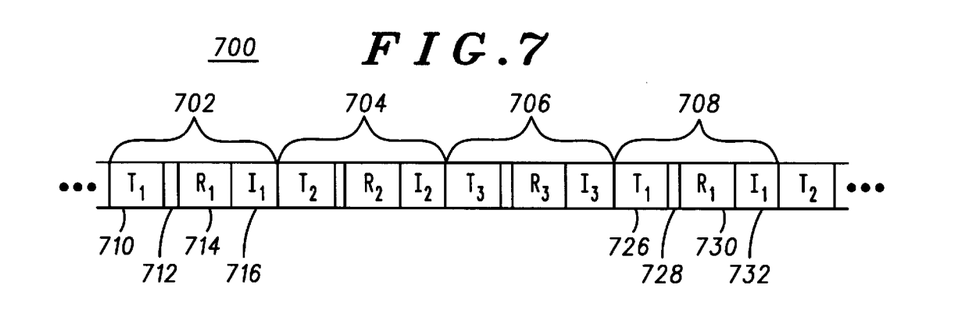
FIG. 7 shows a timing diagram of a time division multiplex (TDM) communication system.

FIG. 7 shows time slots 700 that are representative of a PDC system protocol. In the example shown, first modular unit 106 is assigned to time slots 702 and 708, while time slots 704 and 706 are assigned to other communication devices located within the coverage area of base station 104.

Figure 10:
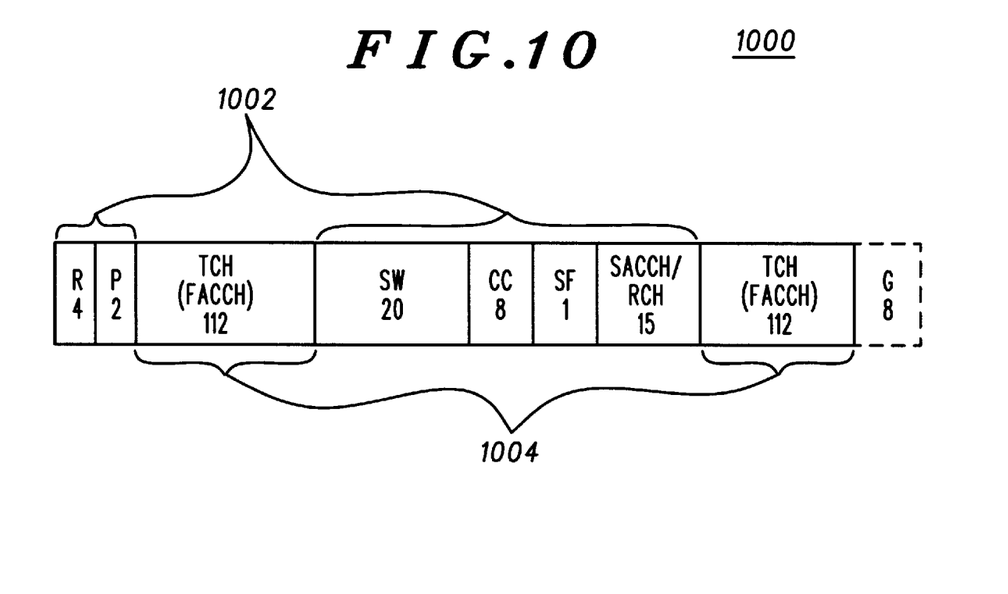
FIG. 10 is a diagram showing a first frame structure of the communication system.

FIG. 10 shows a data slot 1000 used for transmission when sending voice information to base station 104. Data slot 1000 comprises predefined functional channels including system overhead data 1002 and information data 1004. A data slot for sending short messaging information to base station 104 has predefined functional channels that are similar to those of data slot 1000.

Figure 11:
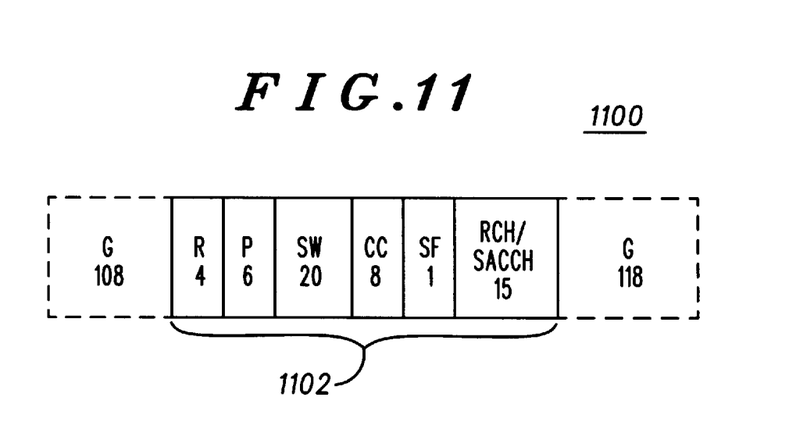
FIG. 11 is a diagram showing a second frame structure of the communication system.

FIG. 11 shows a data slot 1100 used for transmission when no audible signals are present at a mobile station during voice communication. Data slot 1100 comprises predefined functional channels including system overhead data 1102. Since no voice data needs to be sent, data slot 1100 contains no information data similar to information data 1004 of data slot 1000 (FIG. 10). Data slots such as data slot 1100 are typically used in systems having voice-activated transmission (VOX) capability.

Figure 8:
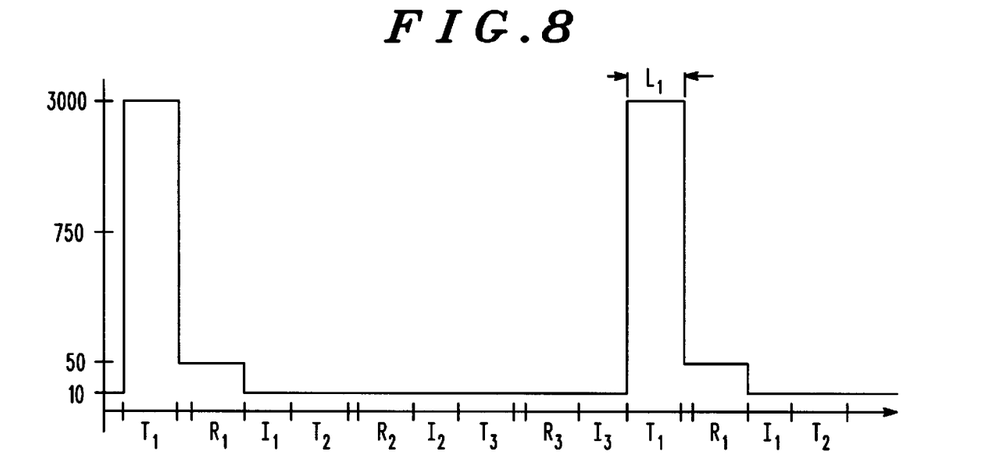
FIG. 8 is a chart showing a first current drain of the modular communication device.

FIG. 8 shows a first current drain of modular communication device 102, taken at points 644 and 646 of electrical circuitry 602. The first current drain is representative of transceiver 606 (FIG. 6) receiving and transmitting within time slots 700 (FIG. 7) when sending data slots such as data slot 1000.

Figure 9:
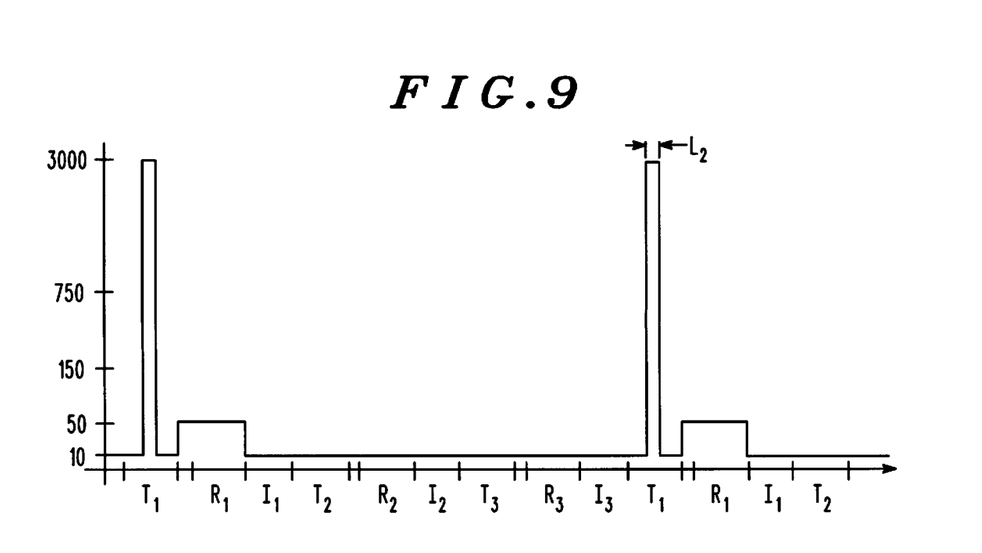
FIG. 9 is a chart showing a second current drain of the modular communication device.

FIG. 9 shows a second current drain of modular communication device 102, also taken at points 644 and 646 of electrical circuitry 602.

The second current drain is representative of transceiver 606 (FIG. 6) receiving and transmitting within time slots 700 (FIG. 7) when sending data slots such as data slot 1100.

Most current is drawn during transmission and amplification periods of power amplifier 628. As shown in FIG. 8, power amplifier 628 amplifies for an amplification period $L_1$ during a transmit slot 726 when transmitting data slot 1000 (FIG. 10). As shown in FIG. 9, power amplifier 628 amplifies for an amplification period $L_2$ during transmit slot 726 when transmitting data slot 1100 (FIG. 11). As shown by FIGS. 8 and 9, amplification period $L_2$ is shorter than amplification period $L_1$.

Figure 12:
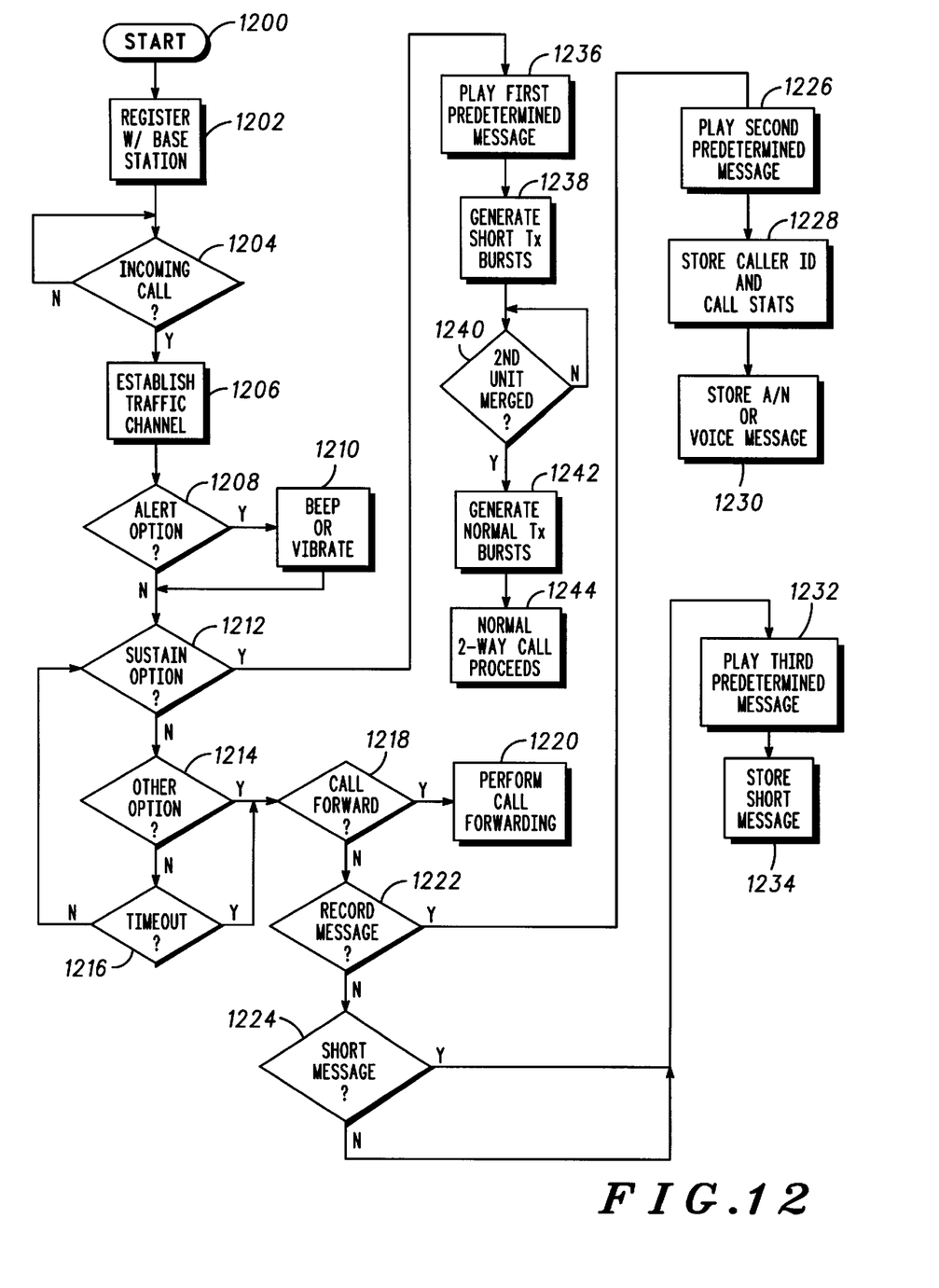
FIG. 12 is a flowchart describing a first method of operating the modular communication device.

FIG. 12 is a flowchart of a method of providing communications for modular communication device 102. This method requires no changes to existing air interface specifications or to existing software in base station 104. Initially, first modular unit 106 is not connected to second modular unit 108. Beginning at a start block 1200, first modular unit 106 registers with base station 104 (step 1202). First modular unit 106 enters into a standby mode, waiting for an incoming call to be received from a calling unit, such as fixed telephone unit 160 or mobile station 162 (step 1204). If an incoming call is received, first modular unit 106 establishes a traffic channel with base station 104 (step 1206). If first modular unit 106 has an alert option available (step 1208), first modular unit 106 alerts the user through alerting circuit 620 or by vibration (step 1210). If a caller ID option is available, base station 104 sends caller ID information and a telephone number from the calling unit is displayed on display 114. Using keys 116, the user may select from a number of options to respond to the call. Alternatively, the number of options are programmable and preset by the user.

If a call sustain option is selected (step 1212), base station 104 plays a first predetermined message to the calling unit, which notifies the calling party to wait (step 1236). During this time, the user of first modular unit 106 wishes to retrieve second modular unit 108 for connecting with first modular unit 106. During the waiting period, first modular unit 106 repeatedly transmits shortened data bursts during its transmit times slots, the shortened data bursts including only the data necessary to maintain the call (step 1238). For example, first modular unit 106 transmits data slots such as data slot 1100 of FIG. 11 during the waiting period. Once second modular unit 108 is merged with first modular unit 106 (step 1240), first modular unit 106 sends normal data bursts containing information data such as voice data (step 1242). For example, first modular unit 106 transmits data slots such as data slot 1000 during this time period. A conventional, two-way, full-duplex voice call proceeds (step 1244).

If a different option is selected (step 1214), such as a call forwarding option (step 1218), the call is forwarded to a selected or preselected telephone number (step 1220).

If a different option is selected (step 1214), such as a record message option (step 1222), a second predetermined message is played to the calling unit which instructs the caller to leave a message (step 1226). Base station 104 may optionally send the caller ID information at this time, and first modular unit 106 stores the caller ID and other call statistics, such as the date and the time of the call (step 1228). The calling unit proceeds to leave a voice message (or alphanumeric message), which first modular unit 106 stores in memory 605.

If a different option is selected (step 1214), such as a short message option (step 1224), a third predetermined message is played to the calling unit, which provides the caller with a selection of predetermined short messages to leave for first modular unit 106 (step 1228). The selected predetermined short message is sent from base station 104 to first modular unit 106 where it is stored in memory 605 (step 1230). For example, one of the predetermined short messages may provide a written message in display 114 reading "URGENT—PLEASE CALL BACK."

Figure 13:
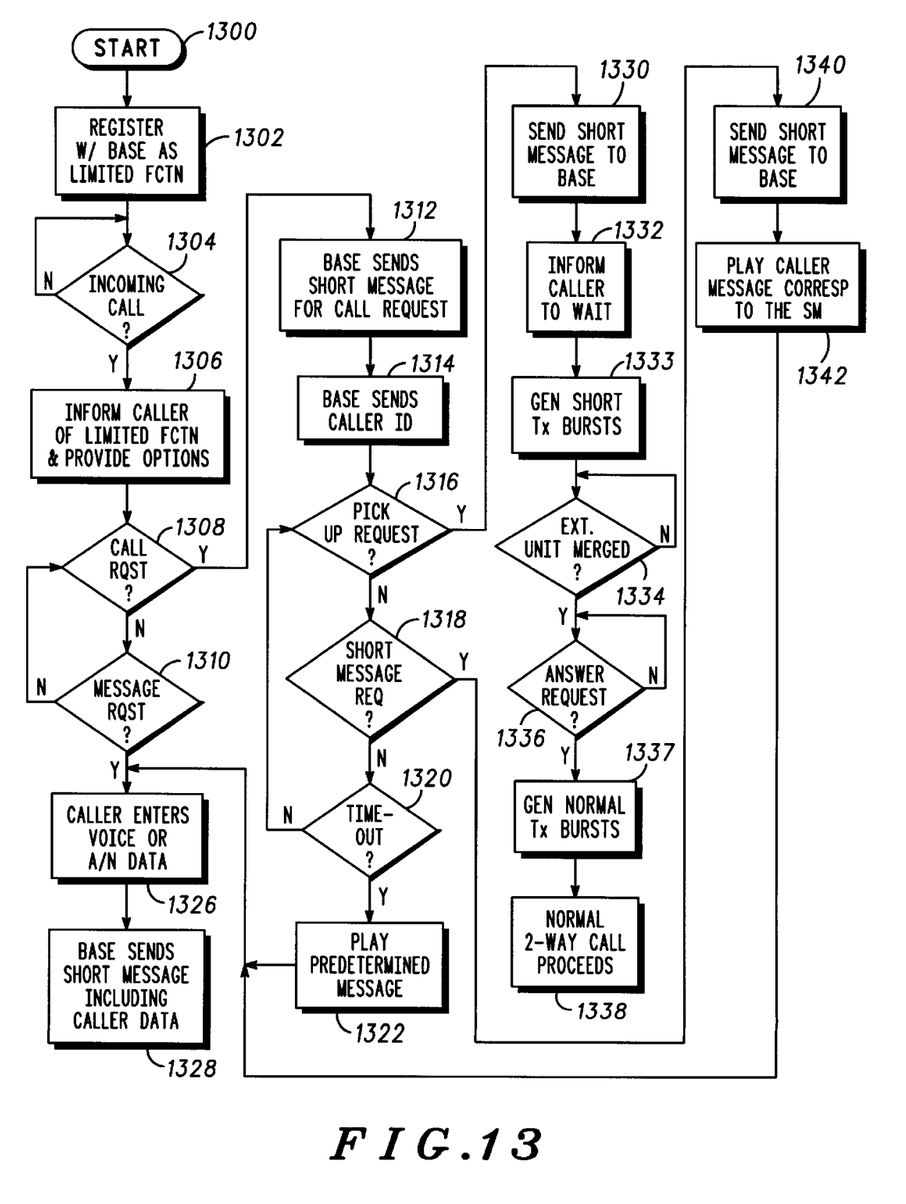
FIG. 13 is a flowchart describing a second method of operating the modular communication device.

FIG. 13 is a flowchart of another method of providing communications for modular communication device 102. This method requires no changes to existing air interface specifications but may require a change in existing software of base station 104. Initially, first modular unit 106 is not connected to second modular unit 108. Beginning at a start block 1300, first modular unit 106 registers with base station 104 as a limited function unit (step 1302). First modular unit 106 enters into a standby mode, waiting for an incoming call to be received from a calling unit, such as fixed telephone unit 160 or mobile station 162 (step 1304). If an incoming call is received, MSTO 156 informs the calling unit that modular communication device 102 has limited functionality (step 1304). Options are provided for the calling unit, such as a call request option and a message request option.

If the calling unit selects the call request option (step 1308), base station 104 sends a short message to first modular unit 106 for a call request (step 1312). Base station 104 may optionally send caller ID information (step 1314). In response to the short message, first modular unit 106 may provide an alert indication for the user.

The user of first modular unit 106 has a number of options for responding thereto. If the user selects a pick-up request option (step 1316), then first modular unit 106 sends a short message to base station 104 (step 1330) to inform the calling unit to wait (step 1332). Here, first modular unit 106 establishes a traffic channel with base station 104. During this time, the user of first modular unit 106 wishes to retrieve second modular unit 108 for connecting with first modular unit 106. During the waiting period, first modular unit 106 repeatedly transmits shortened data bursts during its transmit times slots, the shortened data bursts including only the data necessary to maintain the call (step 1333). For example, first modular unit 106 transmits data slots such as data slot 1100 of FIG. 11 during the waiting period. Once second modular unit 108 is merged with first modular unit 106 (step 1334), the user gets prompted by first modular unit 106 for an answer request option (step 1336). The user then presses one of keys 116 to answer the call. Then, first modular unit 106 sends normal data bursts containing information data such as voice data (step 1337). For example, first modular unit 106 transmits data slots such as data slot 1000 during this time period. A conventional, two-way, full-duplex voice call proceeds (step 1338).

If a different option is selected, such as a message request option (step 1310), a second predetermined message is played to the calling unit which instructs the caller to leave a message. The calling unit proceeds to leave a voice message (or alphanumeric message) (step 1326). Base station 104 proceeds to send a short message to first modular unit 106 informing that a message was sent (step 1328).

If a different option is selected, such as a short message option (step 1318), first modular unit 106 sends a short message to base station 104 (step 1340). The calling unit is played a predetermined message corresponding to the short message sent (step 1342).

Figure 14:
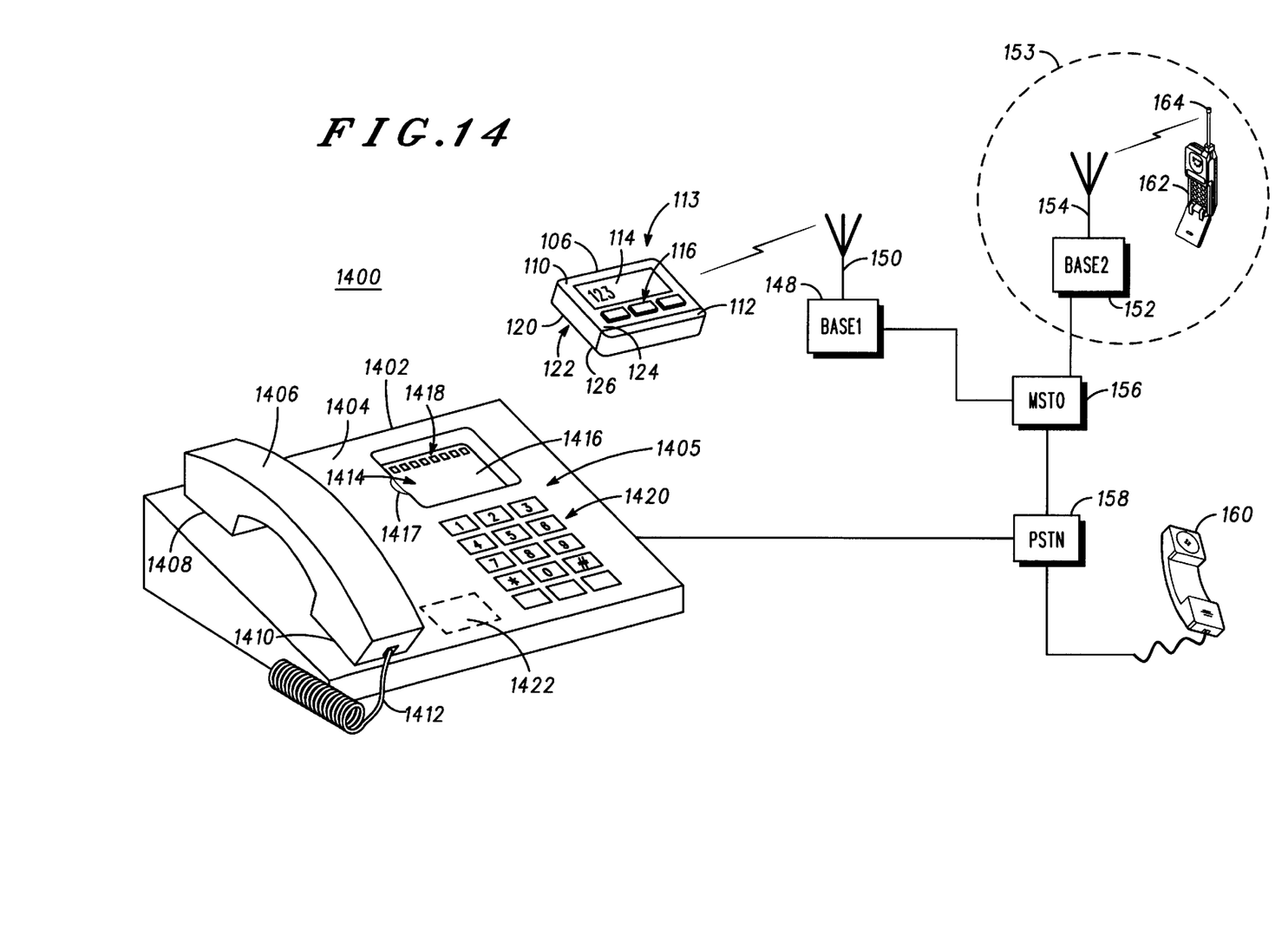
FIG. 14 is an illustration showing a third modular unit that is configured to receive the first modular unit.

As shown in FIG. 14, first modular unit 106 may also be configured for attachment to a third modular unit 1402 of a wireline unit system 1400. Here, second modular unit 1402 includes a housing 1404, a user interface 1404, a connection interface 1414, and electrical circuitry 1422 disposed within housing 1404. User interface 1405 includes a handset 1406 and a keypad 1420. Handset 1406 includes a speaker 1408 and a microphone 1410 (both not visible), and is physically and electrical connected to housing 1404 and electrical circuitry 1422, respectively, through a cord 1412.

Figure 15:
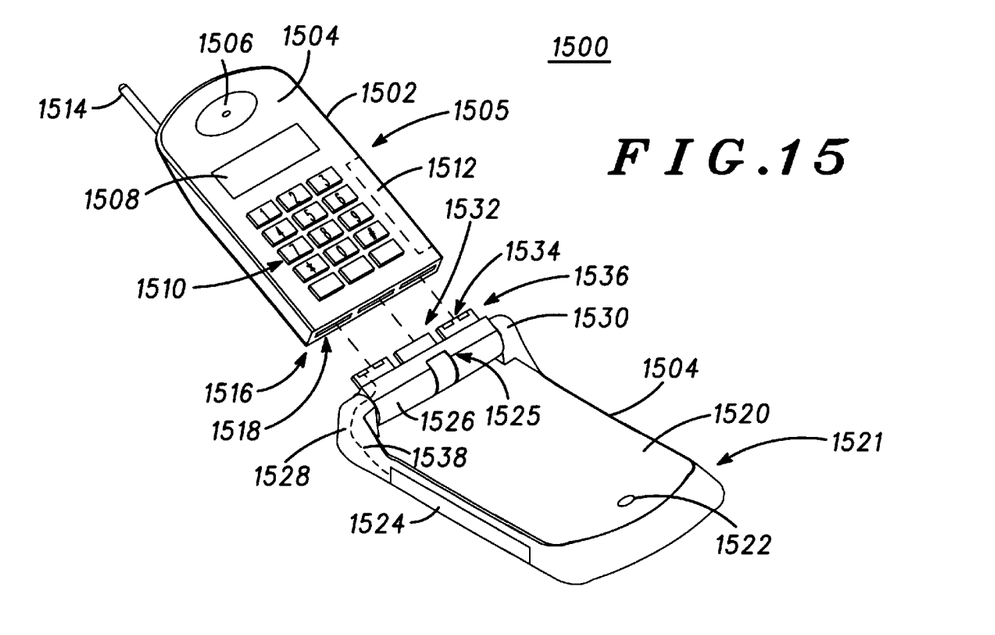
FIG. 15 is an illustration showing a first alternate embodiment of a modular communication device, the modular communication device including a first modular unit and a second modular unit shown unconnected.
Figure 16:
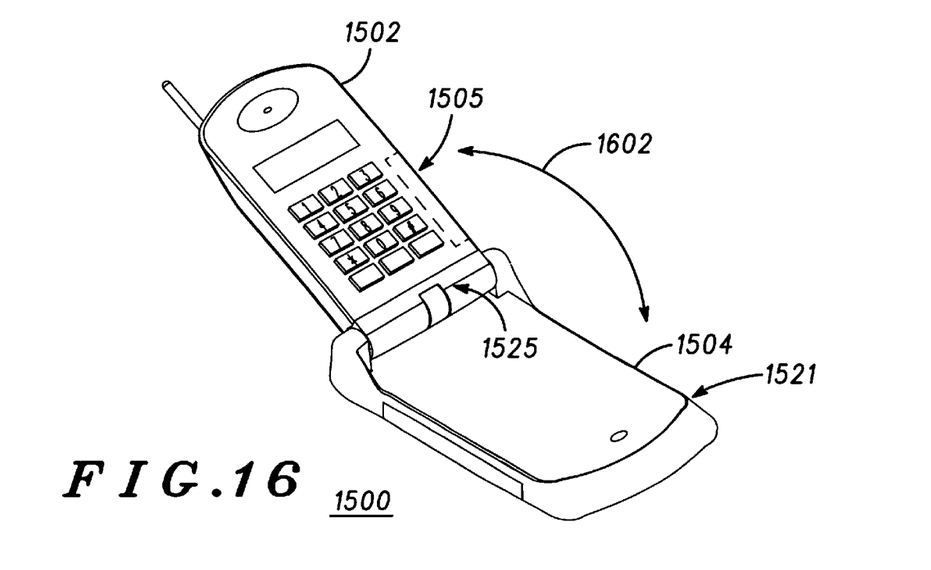
FIG. 16 is an illustration showing the first alternate embodiment of the modular communication device where the first modular unit and the second modular unit are shown connected.

Connection interface 1414 includes an opening 1416 having electrical contacts 1418 therein and a recess 1417 along an edge of opening 1416. Connection interface 1414 is configured for attachment to connection interface 120 of first modular unit 106, as similarly described in relation to FIGS. 1 and 2. When first modular unit 106 is received within opening 1416, electrical contacts 122 make electrical contact with electrical contacts 1418, FIG. 15 is illustration of an isometric view of a modular communication device 1500 including a first modular unit 1502 and a second modular unit 1504. In FIG. 15, first and second modular units 1502 and 1504 are shown detached. In FIG. 16, first and second modular units 1502 and 1504 are shown attached. First modular unit 1502 includes a housing 1504, a user interface 1505, an antenna 1514, a battery compartment 1512, and a connection interface 1516. User interface 1505 includes a display 1508, a keypad 1510, and a speaker disposed within housing 1504 and directed outward from an earpiece 1506. For electrical operation, first modular unit 1702 includes electrical circuitry disposed within housing 1504. First modular unit 1502 operates similarly if not the same as first modular unit 106 of FIG. 1, and the electrical circuitry therein is similar to electrical circuitry 602 of FIG. 6.

While first modular unit 1502 is detached from second modular unit 1504, the speaker of first modular unit 1502 may be used to provide audio signals in a variety of applications. For example, the speaker may be used to provide alert signals in response to received calls, to provide voice or data signals received over the communication channel, or to provide data or voice signals received via short messaging.

Second modular unit 1504 includes a housing 1520, a user interface 1521, a battery connection interface (not visible) for attaching a battery 1524, a connection interface 1532, and a hinging mechanism 1525. User interface 1521 includes a microphone disposed within housing 1520 and directed outward from a hole 1522. Hinging mechanism 1525 includes arms 1528 and 1530 and a cylindrical portion 1526 that is rotatably coupled to housing 1520 via arms 1528 and 1530. Connection interface 1532 includes members 1536 having electrical contacts 1534 that are coupled to battery 1524 through the battery connection interface and to the microphone disposed within housing 1520. In the embodiment shown, connection interface 1532 is coupled to cylindrical portion 1526 of hinging mechanism 1525.

As shown in FIG. 16, while first modular unit 1502 is attached to second modular unit 1502, second modular unit 1702 may open and close about an axis defined by hinging mechanism 1525 as shown by an arrow 1602. Through connection interfaces 1516 and 1532, the microphone of second modular unit 1504 and battery 1524 are coupled to the electrical circuitry of first modular unit 1502. In this configuration, modular communication device 1500 provides the appropriate user interface and physical dimensions for telephone or telephone-like communication. During RF communication, the electrical circuitry within first modular unit 1502 receives electrical signals from the microphone of second modular unit 1504 (generated by voice signals of a user thereof), and provides electrical signals to the speaker of first modular unit 1502 to provide audio signals therefrom. With battery 1524, modular communication device 1500 also provides adequate power for such full-duplex voice communication.

Figure 17:
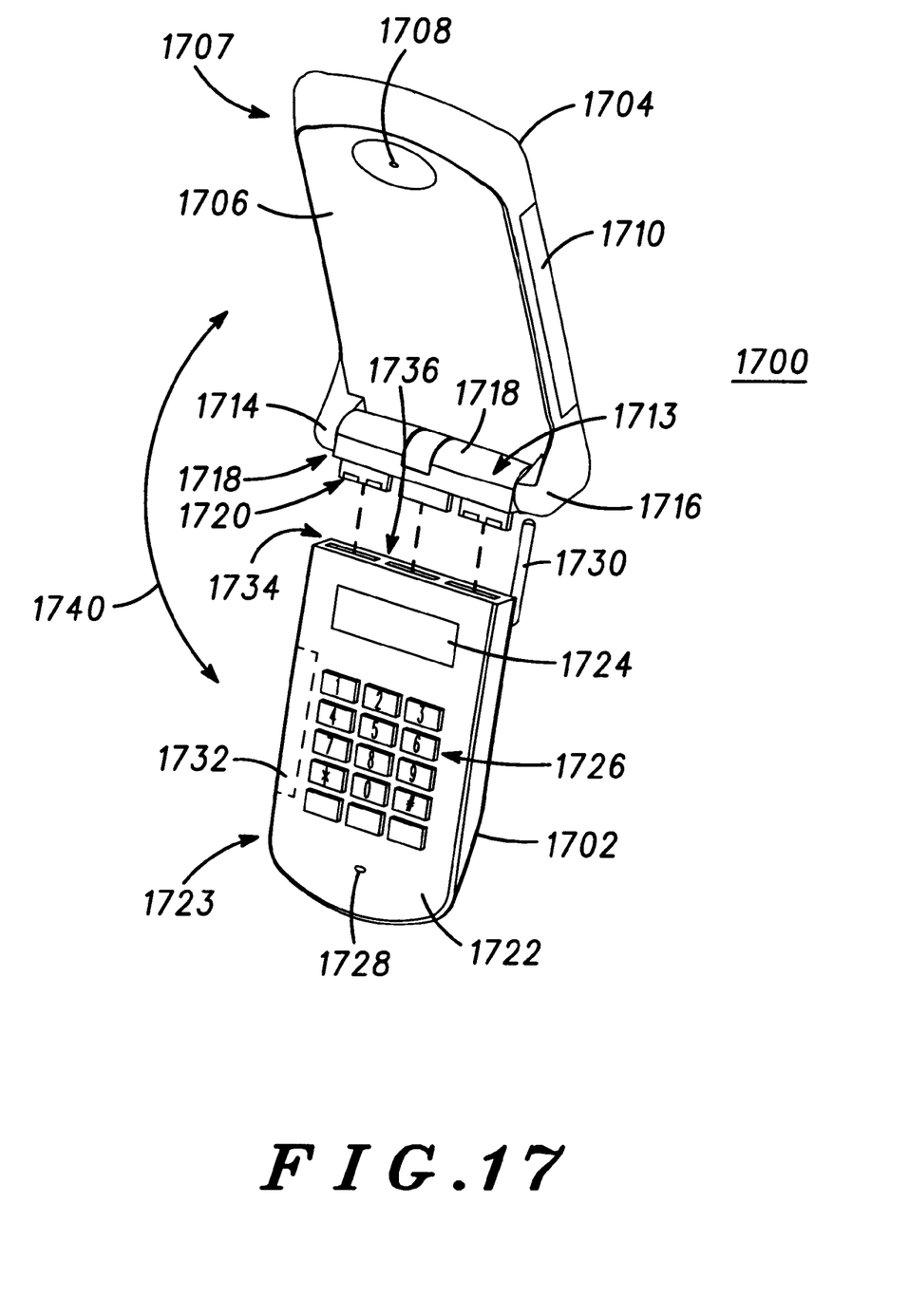
FIG. 17 is an illustration showing a second alternate embodiment of a modular communication device.

FIG. 17 is an illustration of an isometric view of a modular communication device 1700. Modular communication device 1700 includes a first modular unit 1702 and a second modular unit 1704 which are shown detached in FIG. 17. First modular unit 1702 includes a housing 1722, a user interface 1723, an antenna 1730, a battery compartment 1732, and a connection interface 1734. User interface 1723 includes a display 1724, a keypad 1726, and a microphone disposed within housing 1722 and directed outward from a hole 1728. For electrical operation, first modular unit 1702 includes electrical circuitry disposed within housing 1722. First modular unit 1702 operates similarly if not the same as first modular unit 106 of FIG. 1, and the electrical circuitry therein is similar to electrical circuitry 602 of FIG. 6.

Microphone 1728 may be used for recording or storing audible signals, which are later processed and sent to another communication device via short messaging protocols. Alternatively, or in combination with such recording or storing feature, microphone 1728 may be used for inputting voice data and commands for operating first modular unit 106. With any of these options, an appropriate memory or storage device would accomodate first modular unit 1702.

Second modular unit 1704 includes a housing 1706, a user interface 1707, a battery connection interface (not visible) for attaching a battery 1710, a connection interface 1712, and a hinging mechanism 1713. User interface 1707 includes a speaker disposed within housing 1706 and directed outward from an earpiece 1708. Hinging mechanism 1713 includes arms 1714 and 1716 and a cylindrical portion 1718 that is rotatably coupled to housing 1706 via arms 1714 and 1716. Connection interface 1712 includes members 1718 having electrical contacts 1720 that are coupled to battery 1710 through the battery connection interface and to the speaker disposed within housing 1706. In the embodiment shown, connection interface 1712 is coupled to cylindrical portion 1718 of hinging mechanism 1713.

When first modular unit 1702 is attached to second modular unit 1704, second modular unit 1702 may open and close about an axis defined by hinging mechanism 1713, as shown by an arrow 1740. Through connection interfaces 1712 and 1734, the speaker of second modular unit 1704 and battery 1710 are coupled to the electrical circuitry of first modular unit 1702. In this configuration, modular communication device 1700 provides the appropriate user interface and physical dimensions for telephone or telephone-like communication. During RF communication, the electrical circuitry of first modular unit 1702 provides electrical signals to the speaker of second modular unit 1704 to provide audio signals therefrom, and receives electrical signals from the microphone of first modular unit 1502. With battery 1710, modular communication device 1700 also provides adequate power for such full-duplex voice communication.

While particular embodiments of the present invention have been shown and described, modifications may be made. For example, communication system 100 may be a code division multiple access (CDMA) system or a group special mobile (GSM) system. Communciation system 100 is not required to be a digital system, but may be an analog system such as Advanced Mobile Phone System (AMPS) or Narrowband Advanced Mobile Phone System (NAMPS). It is therefore intended in the appended claims to cover all such changes and modifications which fall within the true spirit and scope of the invention.

What is claimed is:

1. A modular portable radio communication device, comprising:
   a first portable modular unit, including:
      a first housing;
      electronic circuitry disposed within said first housing, said electronic circuitry including:

a transceiver for sending and receiving radio communication signals using first and second data transmission rates, and power management circuitry for supplying a first voltage to the electronic circuitry when the transceiver is sending or receiving radio signals using the first data transmission rate and for supplying a second voltage to the electronic circuitry when the transceiver is sending or receiving radio signals using the second data transmission rate;

a first user interface connected to the first housing, said first user interface provided at least for an indication of the calls received by said transceiver;

a first battery connection interface disposed on the first housing, said first battery connection interface provided for coupling to a first battery for electrically powering said electronic circuitry;

a first connection interface disposed on the first housing, said first connection interface coupled to said electronic circuitry;

a second portable modular unit configured to attach to the first portable modular unit, including:
a second housing;
a second user interface connected to the second housing;
a second battery connection interface disposed on the second housing, said second battery connection interface provided for coupling to a second battery; and
a second connection interface disposed on the second housing, said second connection interface provided for attachment to said first connection interface of said first portable modular unit, the attachment coupling said second user interface and said second battery connection interface to said electronic circuitry of said first portable modular unit.

2. The modular portable radio communication device according to claim 1, wherein said first and said second user interfaces operate in combination to provide a third user interface when said first and said second connection interfaces are connected, the third user interface including a microphone and a speaker distanced appropriately for two-way voice communication.

3. The modular portable radio communication device according to claim 2, wherein said first user interface comprises a display and said second user interface comprises said microphone and said speaker.

4. The modular portable radio communication device according to claim 2, wherein said first user interface comprises said speaker and said second user interface comprises said microphone.

5. The modular portable radio communication device according to claim 2, wherein said first user interface comprises said microphone and said second user interface comprises said speaker.

6. The modular portable radio communication device according to claim 2, wherein said first user interface comprises said speaker and a display and said second user interface comprises said microphone.

7. The modular portable radio communication device according to claim 2, wherein said first user interface comprises said speaker and a display and said second user interface comprises said microphone.

8. The modular portable radio communication device according to claim 2, wherein said first user interface comprises a display and said second user interface comprises said microphone and said speaker.

9. The modular portable radio communication device according to claim 1, wherein said first user interface comprises a display and said second user interface comprises a microphone and a speaker.

10. The modular portable radio communication device according to claim 1, wherein said first user interface comprises a display and said second user interface comprises a data receptor and a data transmitter.

11. The modular portable radio communication device according to claim 1, wherein the first data transmission rate includes only data necessary to sustain a call and the second data transmission rate includes data necessary to sustain a call and information data.

12. The modular portable radio communication device according to claim 1, wherein the power management circuitry comprises a capacitor.

13. The modular portable radio communication device according to claim 12, wherein the capacitor is a supercapacitor.

14. The modular portable radio communication device according to claim 1, wherein the power management circuitry comprises:
a first switching circuit operatively connected to the first battery and operatively connected to the second battery when the first and second portable modular units are connected;
a charger-booster circuit connected to the first battery;
means for storing electrical energy connected to the charger-booster circuit; and
a second switching circuit operatively connected to the transceiver and the means for storing electrical energy.

15. The modular portable radio communication device according to claim 14, wherein the means for storing electrical energy comprises a capacitor.

16. The modular portable radio communication device according to claim 15, wherein the capacitor is a supercapacitor.

17. The modular portable radio communication device according to claim 1,
wherein the transceiver further comprises sending and receiving radio signals using a third data transmission rate, and
wherein the power management circuitry further comprises supplying a third voltage to the electronic circuitry when the transceiver is sending or receiving radio signals using the third data transmission rate.

18. A modular communication device, comprising:
a pager unit, said pager unit operable from a first battery, said pager unit providing pager functions and having a first user interface at least providing an indication of calls received from a calling station, wherein the pager unit includes,
a transceiver for sending and receiving radio communication signals using first and second data transmission rates, and
power management circuitry for supplying a first voltage to the electronic circuitry when the transceiver is sending or receiving radio signals using the first data transmission rate and for supplying a second voltage to the electronic circuitry when the transceiver is sending or receiving radio signals using the second data transmission rate; and
a telephone extension unit, said telephone extension unit configured for attachment to a second battery, said telephone extension unit having a second user interface including at least one of a microphone and a speaker, said telephone extension unit configured to attach to said pager unit such that said modular communication device has a length greater than a length of said pager unit for providing appropriate ergonomics for two-way voice communication.

19. The modular communication device according to claim 18, wherein said first user interface includes a display and keys, and wherein said second user interface includes the microphone and the speaker.

20. The modular communication device according to claim 19, wherein said first and said second user interfaces operate in combination to provide a third user interface when said pager unit and said telephone extension unit are attached.

21. A radio communication device operative in a communication system, said radio communication device "having a first modular unit and a second modular unit" comprising:
   a receiver, said receiver to receive a call within the communication system;
   a transmitter for generating shortened transmit data bursts and for generating normal transmit data bursts, wherein the shortened transmit data bursts include only data necessary to sustain the call, the shortened transmit data bursts being irresponsive to voice or data signals at "the first modular unit", wherein the normal transmit data bursts include the data necessary to sustain the call and information data; and
   power management circuitry connected to the receiver and the transmitter, the power management circuitry supplying a first voltage to the transmitter when the transmitter is generating shortened transmit data bursts, the power management circuitry supplying a second voltage to the transmitter when the transmitter is generating normal transmit data bursts.

22. A method of providing communications for a modular radio communication device, "said device having a first modular unit and a modular unit" comprising the steps of:
   (a) registering a first modular unit with a base station;
   (b) receiving an incoming call from a calling unit at the first modular unit;
   (c) establishing a traffic channel between the first modular unit and the base station; and
   (d) transmitting a first predetermined message to the calling unit from the first modular unit if a sustain option is selected, including the substeps of,
      (d1) transmitting shortened data bursts while the first modular unit is separated from the second modular unit, the shortened data bursts including only data necessary to maintain the call, and
      (d2) transmitting normal data bursts when the first modular unit is merged with the second modular unit.

23. The method of providing communications according to claim 22 further comprising the intermediate step of alerting a user of the incoming call.

24. The method of providing communications according to claim 22 further comprising the intermediate step of sending caller identification information from the base station to the first modular unit.

25. The method of providing communications according to claim 22 further comprising the step of:
   (e) forwarding the call to a selected or pre-selected telephone number if a call forwarding option is selected.

26. The method of providing communications according to claim 22 further comprising the steps of:
   (e) playing a second predetermined message if a record message option is selected, the second predetermined message instructing the caller to leave a message; and
   (f) recording a voice or alphanumeric message in a memory of the first modular unit.

27. The method of providing communications according to claim 22 further comprising the steps of:
   (e) playing a third predetermined message if a short message option is selected, the third predetermined message provides the caller with a selection of messages to leave for the first modular unit;
   (f) transmitting a selected message from the base station to the first modular unit; and
   (g) recording the selected message in a memory of the first modular unit.

28. A method of providing communications for a modular radio communication device, "said device having a first modular unit and a modular unit" comprising the steps of:
   (a) registering a first modular unit as a limited function unit with a base station;
   (b) receiving an incoming call from a calling unit at the first modular unit;
   (c) notifying the calling unit that the first modular unit has limited functionality;
   (d) transmitting a message from the base station to the first modular unit for a call request when a call request option is selected by the calling unit; and
   (e) sending a message from the first modular unit to the base station informing the calling unit to wait if a pick-up request option is selected, including the substeps of,
      (e1) establishing a traffic channel between the first modular unit and the base station,
      (e2) transmitting shortened data bursts while the first modular unit is separated from the second modular unit, the shortened data bursts including only data necessary to maintain the call, and
      (e3) transmitting normal data bursts when the first modular unit is merged with the second modular unit.

29. The method of providing communications according to claim 28 further comprising the intermediate step of alerting a user of the incoming call.

30. The method of providing communications according to claim 28 further comprising the intermediate step of sending caller identification information from the base station to the first modular unit.

31. The method of providing communications according to claim 28 further comprising the steps of:
   (f) playing a second predetermined message if a record message option is selected, the second predetermined message instructing the caller to leave a message; and
   (g) recording a voice or alphanumeric message in a memory of the first modular unit.

32. The method of providing communications according to claim 28 further comprising the step of:
   (f) playing a third predetermined message if a short message option is selected, the third predetermined message provides the caller with a selection of messages to leave for the first modular unit;
   (g) transmitting a selected message from the base station to the first modular unit; and
   (h) recording the selected message in a memory of the first modular unit.

* * * * *